United States Patent
Clark et al.

(10) Patent No.: US 7,438,171 B1
(45) Date of Patent: Oct. 21, 2008

(54) RETRACTABLE AND EXTENDABLE MATERIAL LOADER APPARATUS FOR DIRECTING MATERIAL ONTO A CONVEYOR

(75) Inventors: Gregory A. Clark, Gallatin, TN (US); Sid Adel, South Elgin, IL (US); Ronald A. Westfall, Buffalo, MO (US)

(73) Assignee: Benetech Inc., Montgomery, IL (US)

( * ) Notice: Subject to any disclaimer, the term of this patent is extended or adjusted under 35 U.S.C. 154(b) by 0 days.

(21) Appl. No.: 11/776,388

(22) Filed: Jul. 11, 2007

(51) Int. Cl.
*B65G 11/14* (2006.01)
(52) U.S. Cl. .......................... 193/30; 193/25 C; 193/6
(58) Field of Classification Search ................. 198/588, 198/812; 193/3, 6, 25 C, 30; 414/141.8, 414/143.1, 299
See application file for complete search history.

(56) References Cited

U.S. PATENT DOCUMENTS

| | | | | |
|---|---|---|---|---|
| 502,194 | A * | 7/1893 | Johnston | 193/30 |
| 1,400,658 | A * | 12/1921 | Brown | 193/30 |
| 4,182,591 | A | 1/1980 | Stanelle | |
| 4,277,214 | A | 7/1981 | Mahle et al. | |
| 4,371,305 | A | 2/1983 | Pannell | |
| 4,721,425 | A | 1/1988 | Strocker | |
| 4,946,018 | A | 8/1990 | Binzen et al. | |
| 5,016,686 | A * | 5/1991 | Gerstenkorn | 193/30 |
| 5,154,271 | A | 10/1992 | Binzen | |
| 5,372,229 | A | 12/1994 | Leibling | |
| 5,673,779 | A * | 10/1997 | Spickelmire | 193/6 |
| 5,685,416 | A * | 11/1997 | Bonnet | 198/812 |
| 5,800,112 | A | 9/1998 | Stafford | |
| 6,019,147 | A | 2/2000 | Prescott et al. | |
| 6,041,907 | A * | 3/2000 | Bonnette | 193/6 |
| 7,036,647 | B2 | 5/2006 | Malmberg | |

\* cited by examiner

*Primary Examiner*—James R Bidwell
(74) *Attorney, Agent, or Firm*—Thompson Coburn LLP; Joseph M. Rolinicki, Esq.

(57) ABSTRACT

A retractable and extendable material loader that directs material onto a conveying surface of a belt conveyor has a retractable and extendable tubular length where the length of the loader is extended to direct material through the loader onto the conveyor, and a length of the loader is retracted when the loader is not directing material onto the conveyor to provide adequate clearance for material loaded onto the conveyor by another loader located upstream of the retractable and extendable loader. The apparatus provides improved environmental conditions over the current art, improved health and safety conditions of personnel over the current art, and improved operational safety conditions in respect to explosion risk over the current art.

23 Claims, 3 Drawing Sheets

RETRACTABLE AND EXTENDABLE MATERIAL LOADER APPARATUS FOR DIRECTING MATERIAL ONTO A CONVEYOR

BACKGROUND OF THE INVENTION

1. Field of the Invention

The present invention pertains to a bulk material loader that directs material onto a conveying surface of a belt conveyor. In particular, the present invention is a material loader that has a retractable and extendable tubular length where the length of the loader is extended to direct material through the loader onto the moving belt surface of a conveyor, and the length of the loader is retracted when the loader is not directing material onto the conveyor to provide adequate clearance for material loaded onto the conveyor by another loader located upstream of the conveyor.

2. Description of the Related Art

The transporting of bulk material, for example coal, from one area to another often involves the transfer of a stream or flow of the material from two or more conveyors onto another, single conveyor. In the transfer of the material from one conveyor to a second conveyor, it is often necessary that the material be discharged from the first conveyor into a tubular loader. The material falls through the tubular loader and is directed by the loader onto the conveying surface of the second conveyor. The bulk material exits a bottom opening of the tubular loader and impacts with the moving conveying surface of the second conveyor.

The conveying surface of the second conveyor is often moving at a slower speed than the speed of the bulk material falling through the loader. The faster speed of the material impacting the conveying surface can result in spillage of the bulk material from the sides of the conveying surface. To reduce the amount of spillage, it is desirable that the exit opening or bottom opening of the tubular loader be positioned in close proximity to the conveying surface so that the material exiting the bottom opening has a minimum amount of undirected free-fall to the conveying surface.

The need to position the bottom exit opening of the tubular loader in close proximity to the conveying surface presents problems when two or more conveyors discharge bulk material to two or more tubular loaders that direct the material to a single receiving conveyor. The two loaders are positioned along the length of the receiving conveyor with the first of the loaders positioned toward the upstream end of the receiving conveyor and the second of the loaders positioned in the downstream direction of the receiving conveyor from the first loader. The two discharging conveyors are typically alternately operated so that only one conveyor at a time is discharging bulk material to one of the two loaders, and the one loader is directing the material onto the receiving conveyor. With this arrangement, it is possible to position the bottom outlet opening of the first, upstream loader in close proximity to the conveying surface of the conveyor. However, the bottom, outlet opening of the second, downstream loader cannot be positioned in close proximity to the conveying surface of the receiving conveyor without coming into contact with material loaded onto the conveying surface by the upstream loader. The bottom, outlet opening of the second, downstream loader must be positioned higher above the conveying surface of the receiving conveyor than the bottom, outlet opening of the first, upstream loader in order to provide adequate clearance for the material loaded onto the conveying surface by the first, upstream loader to pass beneath the bottom outlet opening of the second, downstream loader. The need to position the bottom outlet opening of the second, downstream loader at a higher position above the conveying surface presents the problem of increased spillage of the bulk material directed through the second, downstream loader onto the conveying surface.

SUMMARY OF THE INVENTION

The retractable and extendable material loader apparatus of the present invention overcomes the disadvantages associated with the prior art second, downstream material loader that directs material onto a conveying surface of a conveyor downstream from a first, upstream loader. The apparatus provides improved environmental conditions over the current art, improved health and safety conditions of personnel over the current art, and improved operational safety conditions in respect to explosion risk over the current art. This is accomplished by providing the material loader apparatus with a retractable and extendable length where the length can be extended to discharge material onto a conveying surface, and can be retracted to provide adequate clearance for material discharged onto the conveying surface by the first, upstream loader. The material loader apparatus of the invention thereby overcomes the disadvantages associated with prior art loader apparatus that direct bulk material from two or more supply conveyors, through two or more loader apparatus to a single receiving conveyor.

The retractable and extendable material loader apparatus of the invention is designed as part of a conventional funnel-shaped hopper or transition chute that receives a supply of bulk material from a discharge conveyor and directs the received bulk material onto the conveying surface of a receiving conveyor. The retractable and extendable material loader apparatus is basically comprised of a first, upper tubular section and a second, lower tubular section that are connected together for telescoping movement. The apparatus is designed to be used on any number of transition chutes that receive bulk material from any number of discharge conveyors and direct the bulk material to the conveying surface of a single receiving conveyor.

The first, upper tubular section is connected to a lower end of the funnel-shaped transition chute where it receives bulk material falling through the chute. The upper tubular section has a cylindrical upper sidewall, with opposite top and bottom openings. The upper sidewall receives the bulk material from the funnel-shaped chute and directs the material through the upper sidewall.

The second, lower tubular section is connected to the first, upper tubular section for relative telescoping movement of the lower section over the upper section. The lower tubular section has a conical lower sidewall with opposite top and bottom openings. The lower sidewall extends around the upper sidewall to receive the material exiting the upper sidewall and to direct the material through the lower sidewall. The material exits the lower sidewall onto the conveying surface of the belt conveyor.

The upper and lower sidewalls are moveable between retracted relative positions where the upper and lower sidewalls have a first combined length, and extended relative positions where the upper and lower sidewalls have a second combined length that is larger than the first combined length.

A plurality of actuators are operatively connected between the upper and lower sidewalls. The actuators are selectively operable to move the lower sidewall over the upper sidewall between the retracted relative positions and the extended relative positions of the upper and lower sidewalls.

A plurality of vertical columns are fixed stationary to the upper tubular section. The columns are spatially arranged around the upper tubular section and are parallel to each other. The columns have lengths that extend downwardly alongside the upper tubular section and alongside a portion of the lower tubular section.

A plurality of rollers are mounted on the lower tubular section. The rollers are spatially arranged around the lower tubular section at positions that correspond to the positions of the plurality of columns on the upper tubular section. The pluralities of rollers engage in rolling contact with the plurality of columns. Surfaces of the columns that engage with the rollers function as guide surfaces that direct the rollers vertically upwardly and downwardly across the columns as the lower tubular section is telescoped upwardly and downwardly over the upper tubular section by operation of the actuators. Stop surfaces are provided on the plurality of columns where the rollers will engage with the stop surfaces when the lower tubular section is moved to its extended position relative to the upper tubular section to prevent further movement of the lower tubular section toward the extended position.

In operation, the retractable and extendable material loader is positioned along a conveyor in a downstream direction from at least one other material loader positioned upstream along the conveyor. When the other upstream material loader is not loading material on the conveyor and the retractable and extendable material loader is loading material on the conveyor, the actuators are operated to extend the lower tubular section from the upper tubular section. This positions the bottom opening of the lower tubular section in close proximity to the conveying surface of the conveyor. Bulk material is then loaded onto the conveying surface of the conveyor through the upper tubular section and the extended lower tubular section. The positioning of the lower tubular section in close proximity to the conveying surface reduces the potential for spillage of the material as it exits the extended lower tubular section and contacts the moving conveying surface.

When it is desirable to load material onto the conveying surface from the other upstream material loader, the actuators of the retractable and extendable material loader are then operated to move the lower tubular section upwardly to the retracted position relative to the upper tubular section. This raises the lower tubular section above the conveying surface and provides adequate clearance for the material loaded onto the conveying surface from the other upstream material loader to pass beneath the retractable and extendable material loader.

Thus, the apparatus of the invention overcomes the problem of spillage of material from a moving conveying surface by a second material loader positioned along the conveying surface.

BRIEF DESCRIPTION OF THE DRAWINGS

Further the features of the invention are set forth in the following detailed description of the invention and in the drawing figures.

DETAILED DESCRIPTION OF THE PREFERRED EMBODIMENT

Figure 1:
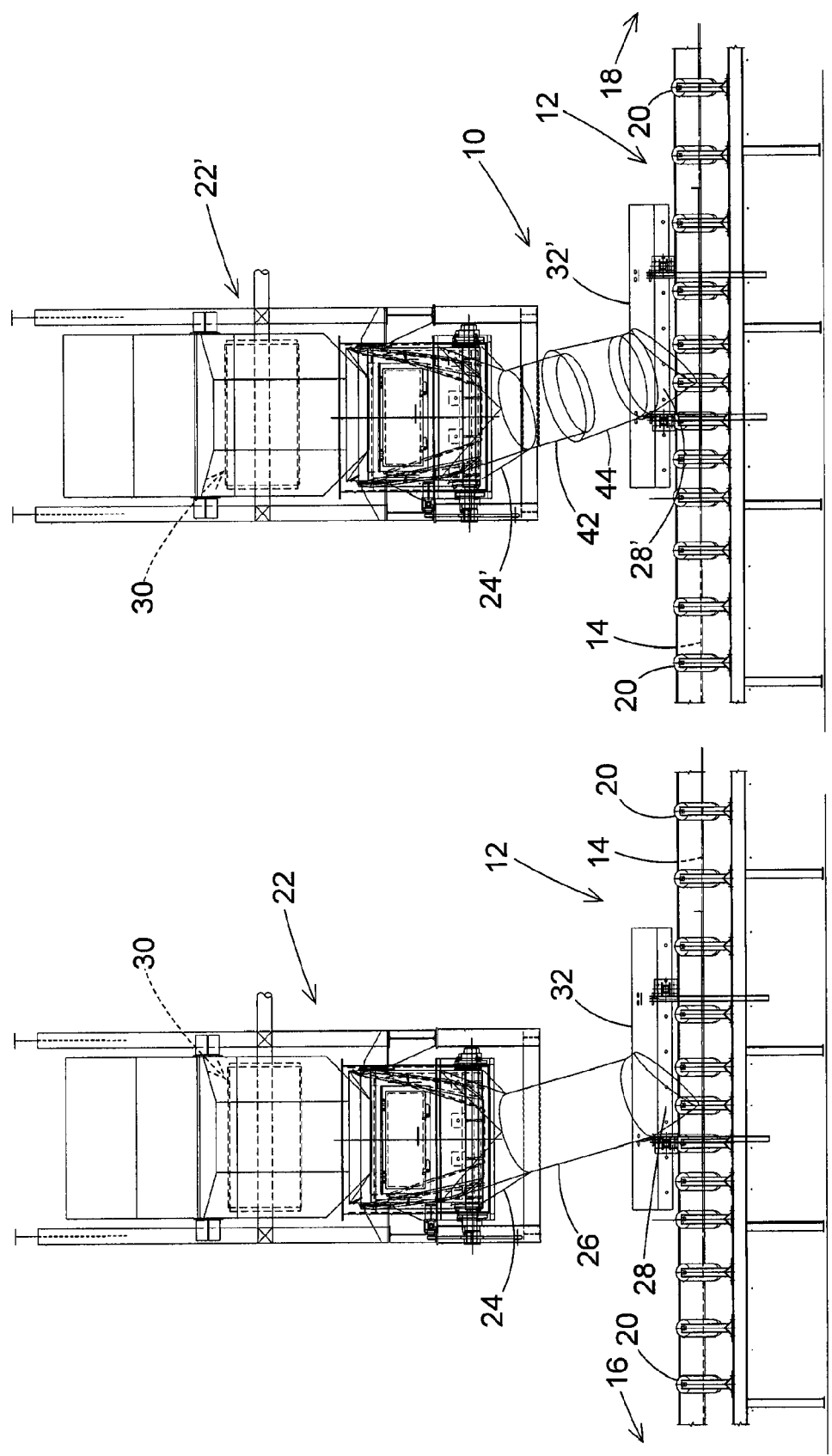
FIG. 1 is a schematic representation of one operative environment of the retractable and extendable material loader apparatus of the invention.

FIG. 1 is a schematic representation of one operative environment of the retractable and extendable material loader apparatus 10 of the present invention. It should be understood that the environment of FIG. 1 is only one example of an environment in which the apparatus may be used. There are other environments where the apparatus of the invention is equally well suited for use, and FIG. 1 should not be interpreted as the only operative environment in which the apparatus of the invention may be used.

A schematic representation of a conveyor 12 having a belt conveying surface 14 is shown in FIG. 1. The conveyor 12 is any conventional design of a belt conveyor that conveys bulk material in a downstream direction from an upstream end 16 of the conveyor shown to the left of FIG. 1, to a downstream end 18 of the conveyor shown to the right in FIG. 1. The conveyor 12 is basically comprised of a frame that supports a plurality of rollers 20. The rollers 20 are arranged to support the belt conveying surface 14 in a u-shaped configuration that extends into the plane of FIG. 1. The u-shaped configuration of the conveying surface 14 forms a moving trough. The trough supports bulk material, for example coal, delivered onto the conveying surface 14 and prevents the spillage of the bulk material from the opposite sides of the conveying surface.

FIG. 1 also shows a schematic representation of a bulk material transfer 22 positioned toward the upstream end 16 of the conveyor 12. Bulk material transfer 22 of the type shown in FIG. 1 are known in the art, and therefore the component parts of the transfer 22 will be described only generally. Basically, the loader includes a funnel-shaped hopper or chute 24 that is selectively supplied with bulk material from a separate, discharge conveyor 30. The bulk material supplied to the chute 24 by the discharge conveyor 30 falls through the chute and is directed to a loading tube 26 positioned at the bottom of the chute 24. The bulk material continues to fall through the loading tube 26 and is directed by a loading chute 28 at the bottom of the loading tube 26 onto the conveying surface 14 of the conveyor 12. The loading chute 28 is partially positioned within the u-shaped cross-section of the conveying surface 14 to avoid the spillage of the bulk material loaded onto the conveying surface 14 off of the opposite sides of the conveying surface.

A pair of side plates or guards 32 are positioned on the opposite sides of the conveyor 12. The guards also aid in preventing the bulk material loaded onto the conveying surface 14 from spilling off of the opposite sides of the conveyor 12 due to the impact of the bulk material on the conveying surface 14. The bulk material loaded onto the conveying surface 14 is conveyed in the downstream direction to the right as shown in FIG. 1.

FIG. 1 also shows a second, downstream bulk material transfer 22' that has been modified with the retractable and extendable material loader apparatus 10 of the present invention. Many of the component parts of the downstream material transfer 22' are the same as those of the upstream transfer 22, and are identified with the same reference numbers followed by a prime ('). It can be seen from viewing FIG. 1 that the bulk material loaded onto the conveying surface 14 from the upstream material loader 22 would contact the loading chute 28' of the downstream material transfer 22' as the material is conveyed in the downstream direction. As explained earlier, in the prior art this required that the loading tube 26' and loading chute 28' of the prior art downstream transfer 22' be elevated above the conveyor 12 to provide clearance for the bulk material being conveyed beneath the downstream loader. This disadvantage of the prior art is overcome by the retractable and extendable material loader apparatus 10 of the invention. The retractable and extendable material loader apparatus 10 has a length that can be extended to discharge material onto the conveying surface 14, and can be retracted to provide adequate clearance for material discharged onto the conveying surface 14 by the first, upstream transfer 22. The retractable and extendable material loader apparatus 10 thereby overcomes the disadvantages associated with prior art loader apparatus that direct bulk material from two or more supply conveyors, through two or more loader apparatus to a single receiving conveyor.

As represented schematically in FIG. 1, the retractable and extendable material loader apparatus 10 is designed to be assembled to a conventional funnel shaped transition chute 24' of a bulk material transfer 22'. The transition chute 24' receives bulk material from a separate discharge conveyor 30 and directs the bulk material into the retractable and extendable material loader apparatus 10. The apparatus 10 then directs the material through a conventional loading chute 28' to the conveying surface 14 of the conveyor 12.

Figure 3:
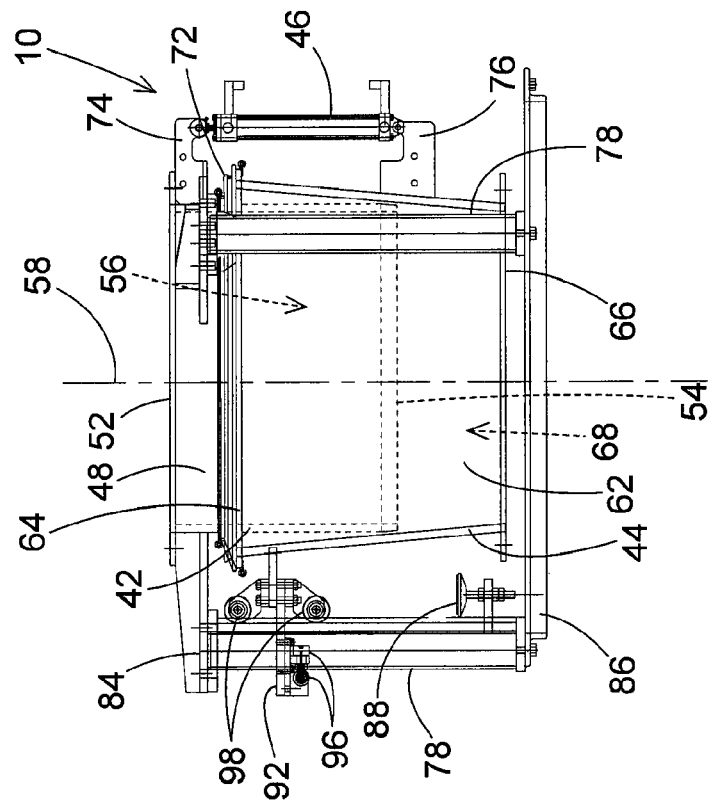
FIG. 3 is a side elevation view of the apparatus in the retracted length condition of the apparatus.
Figure 2:
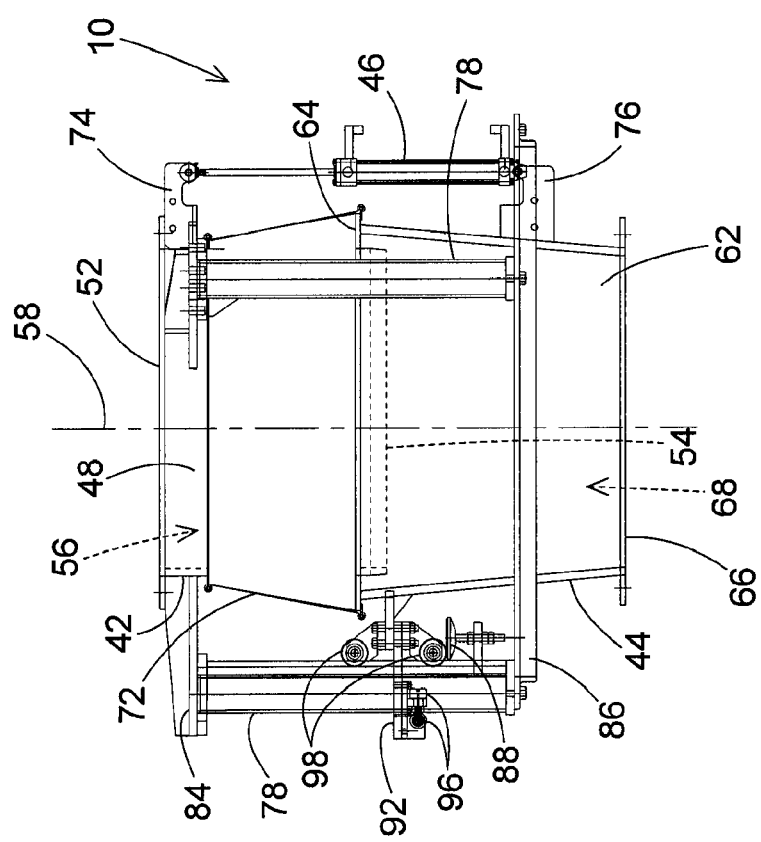
FIG. 2 is a side elevation view of the apparatus in the extended length condition of the apparatus.

FIGS. 2 and 3 show the retractable and extendable material loader apparatus 10 removed from the bulk material transfer 22' of FIG. 1. The apparatus 10 is basically comprised of a first, upper tubular section 42 and a second, lower tubular section 44. The upper section 42 and lower section 44 are connected together for relative telescoping movement between retracted and extended relative positions. The telescoping movement is produced by a plurality of actuators 46 that are operatively connected between the upper tubular section 42 and the lower tubular section 44.

The first, upper tubular section 42 is designed to be connected to the lower end of the funnel-shaped transition chute 24' of a conventional bulk material transfer 22'. The upper tubular section 42 is primarily comprised of a cylindrical upper sidewall 48. The upper sidewall 48 has a length that extends between a circular top edge 52 of the sidewall that defines a top opening, and an opposite circular bottom edge 54 of the sidewall that defines a bottom opening. A hollow interior bore 56 extends through the length of the upper sidewall 48 between the top edge 52 and the bottom edge 54. The interior bore 56 has a center axis 58. The interior bore 56 receives the bulk material from the transition chute 24' through the top opening defined by the sidewall top edge 52, and directs the material through the upper sidewall 48 with the material exiting the upper sidewall through the bottom opening defined by the sidewall bottom edge 54.

The second, lower tubular section 44 is primarily comprised of a conical lower sidewall 62. The lower sidewall 62 has a circular top edge 64 that defines a top opening into the sidewall, and a circular bottom edge 66 that defines a bottom opening of the sidewall. A hollow interior bore 68 extends through the lower sidewall 62 from the top opening defined by the top edge 64 to the bottom opening defined by the bottom edge 66. The interior bore 68 of the lower sidewall has a center axis that is coaxial with the center axis 58 of the upper sidewall 48. The lower sidewall 62 extending around the upper sidewall 48 positions the lower sidewall to receive material exiting the upper sidewall through the top opening defined by the lower sidewall top edge 64, and to direct the material through the lower sidewall with the material exiting the lower sidewall through the bottom opening defined by the lower sidewall bottom edge 66. The material exiting the lower sidewall 62 is directed by a loading chute 28' onto the conveying surface 14 of the belt conveyor 12.

As seen in FIGS. 2 and 3, the interior diameter of the lower sidewall 62 gets larger as the sidewall extends from its bottom edge 66 to its top edge 64. This enables the lowered sidewall 62 to telescope over the upper sidewall 48. FIGS. 1 and 2 show the lower sidewall 62 and the upper sidewall 48 in their extended, relative positions. FIG. 3 shows the lower sidewall 62 and the upper sidewall 48 in their retracted relative positions. From comparing FIGS. 2 and 3, it can be seen that in the extended relative positions of the upper 48 and lower 62 sidewalls, the combined interior bores 56, 68 have a larger length than the combined interior bores of the upper sidewall 48 and lower sidewall 62 in the retracted relative positions. In both the extended relative positions shown in FIG. 2 and the retracted relative positions shown in FIG. 3, a portion of the lower sidewall 62 surrounds and telescopes over a portion of the upper sidewall 48.

A generally flexible, collapsible sealing boot 72 is connected between the upper sidewall 48 and lower sidewall 62. The boot 72 prevents dust from the bulk material passing through the upper tubular section 42 and lower tubular section 44 from escaping between the connection of the two sections. FIG. 2 shows the boot 72 in its extended position connecting the upper tubular section 42 to the lower tubular section 44: FIG. 3 shows the boot 72 in its collapsed position.

Figure 4:
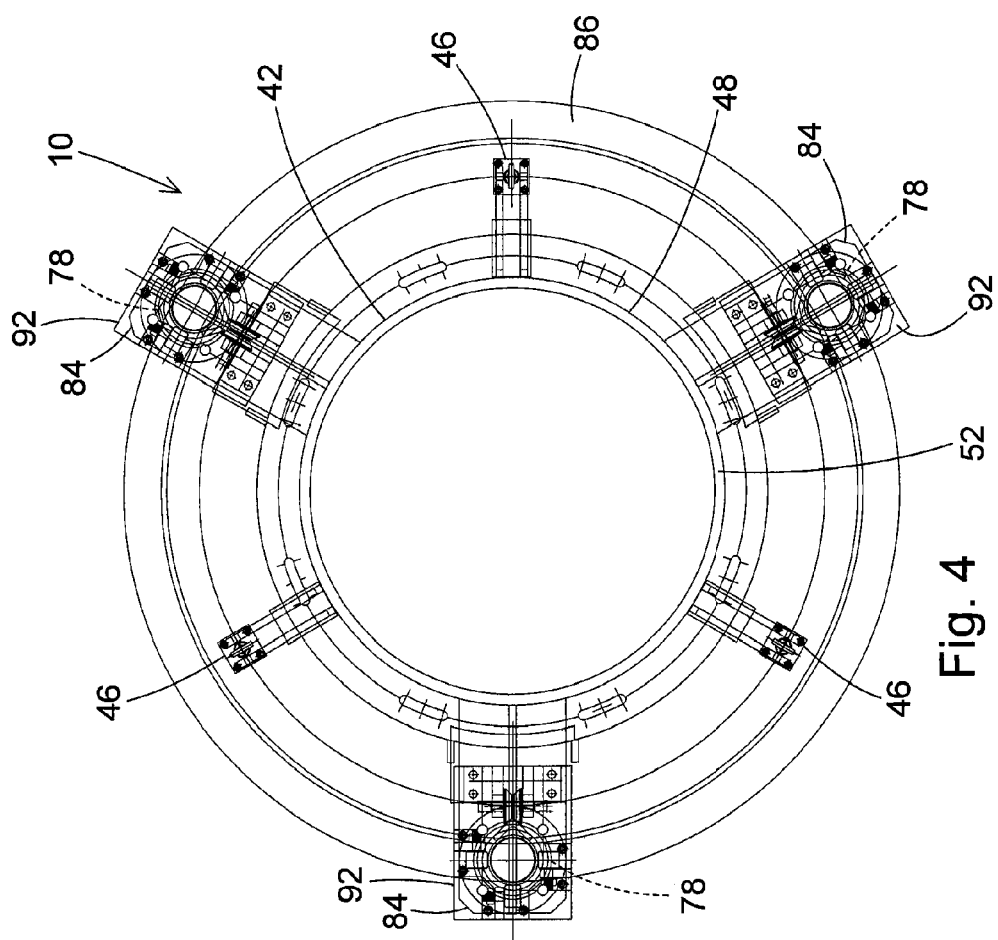
FIG. 4 is a top plan view of the apparatus.

In the embodiment shown in the drawing Figures, there are three actuators 46 operatively connected between the upper tubular section 42 and the lower tubular section 44. As seen in FIG. 4, the actuators 46 are spacially arranged around the peripheries of the two tubular sections. Each of the actuators 46 is connected by pivoting connections to projecting flanges 74 on the upper tubular section 42 and projecting flanges 76 on the lower tubular section 44. These flanges 74, 76 operatively connect the actuators 46 between the upper 42 and lower 44 tubular sections. The particular actuators 46 shown in the drawing Figures are pneumatic actuators. As is conventional, supplying pressurized air to opposite fittings at the opposite ends of the actuators selectively extends and retracts a piston rod and selectively moves the upper 42 and lower 44 tubular sections between their extended positions shown in FIG. 2 and their retracted positions shown in FIG. 3. Although pneumatic actuators 46 are shown in the drawing Figures, other functionally equivalent actuators may be employed.

A plurality of straight, parallel columns 78 are fixed stationery to the upper tubular section 42 in positions that are parallel to the center axis 58 of the upper 48 and lower 62 sidewalls. The columns 78 are cylindrical along their lengths, and have peaked ridges or rails 82 that extend along their lengths. The rails 82 are positioned on the columns opposing the upper 42 and lower 44 tubular sections. Each of the columns 78 is connected to the upper tubular section 42 adjacent the top edge 52 of the upper sidewall 48 by arm assemblies 84 that project radially outwardly from the upper sidewall 48. The arm assemblies 84 space the columns 78 radially outwardly from both the upper sidewall 48 and lower sidewall 62. The bottom ends of the columns 78 are interconnected by a circular rim 86. The rim 86 is spaced radially outwardly from the lower sidewall 62. The columns 78 have lengths that extend downwardly alongside the upper tubular section 42, across the top opening defined by the top edge 64 of the lower sidewall 62, across the bottom opening defined by the bottom edge 54 of the upper sidewall 48, and alongside a portion of the lower sidewall length 62. The surfaces of the columns function as guide surfaces that direct the telescoping movement of the lower tubular section 44 across the upper tubular 42, as will be explained. The columns 78 extend along the length of the upper sidewall 48 and along a portion of the length of the lower sidewall 62 when the upper 48 and lower 62 sidewalls are in their extended relative positions. As shown in FIG. 3, the columns 78 extend beyond the combined lengths of the upper sidewall 48 and lower sidewall 62 when the upper 48 and lower 62 sidewalls are in their retracted relative positions.

Figure 5:
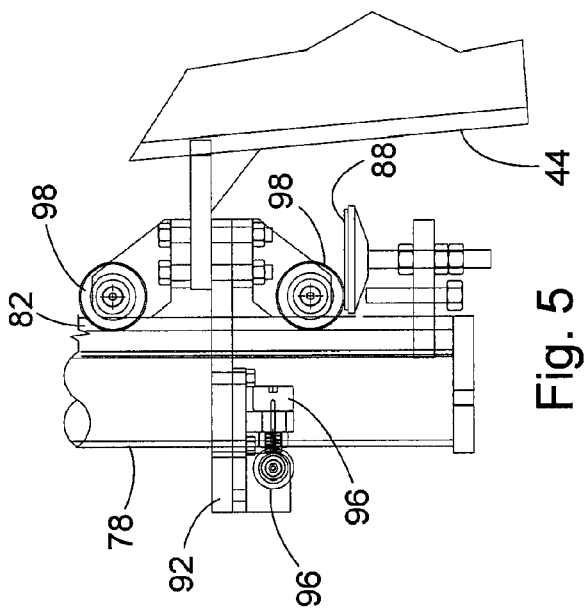
FIG. 5 is a partial side elevation view of a portion of the apparatus.

Adjacent the rim 86, each of the columns 78 is provided with a stop surface 88. The detail of each stop surface 88 can be seen in FIG. 5. The position of the stop surface 88 is adjustable along the length of the column 78. The stop surfaces 88 function to limit the movement of the lower sidewall 62 downwardly from the upper sidewall 48 to the extended relative positions of the upper 48 and lower 62 sidewalls, as will be explained.

The plurality of follower arms 92 projected radially outwardly from the lower tubular section 44. The follower arms 92 are spacially arranged around the circumference of the lower sidewall 62 of the lower tubular section 44. The positions of the follower arms 92 correspond to the positions of the columns 78 on the upper tubular section 42. The follower arms 92 have openings 94 that receive the columns 78. The columns 78 extending through the follower arm openings 94 guide the follower arms 92 and maintain the lower sidewall 62 in its coaxially aligned position relative to the upper sidewall 48 as the lower tubular section 44 telescopes over the upper tubular section 42.

Figure 6:
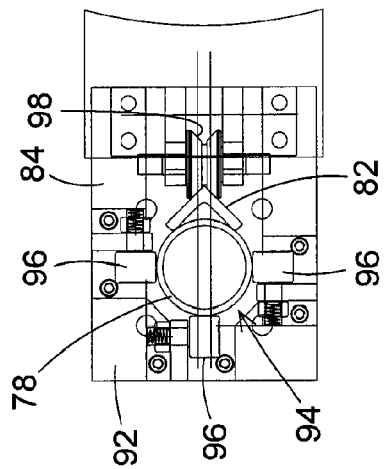
FIG. 6 is a partial top plan view of a portion of the apparatus.

A plurality of rollers 96 are mounted on the follower arms 92. As shown in the detail of FIG. 6, the plurality of rollers 96 are mounted for rotation on the follower arms 92 at positions around the openings 94 through the follower arms. Furthermore, the plurality of rollers 96 are mounted on the follower arms 92 in rolling engagement with the exterior surfaces of the columns 78. Pairs of the plurality of rollers 96 engage with the columns 78 on opposite sides of the columns to precisely maintain the lower tubular section 44 in its coaxially aligned position relative to the upper tubular section 42 as the lower tubular section is moved between the retracted and extended positions. The surfaces of the columns 78 that engage with the rollers 96 function as guide surfaces that direct the rollers vertically upwardly and downwardly across the columns as the lower tubular section 44 is telescoped upwardly and downwardly over the upper tubular section 42 by operation of the actuators 46. In addition to the above, at least one of the rollers 96 on each follower arm 92 is positioned to engage the opposite side of the columns 78 from the lower tubular section 44. This further positively positions the lower tubular section 44 in its axially aligned orientation with the upper tubular section 42 as the sections are moved between their extended and retracted relative positions.

An additional set of rollers 98 is provided on each of the follower arms 92. The additional rollers 98 have v-shaped engagement surfaces that engage in rolling engagement with the peaked surfaces of the column rails 82. The engagement of these additional rollers 98 with the column rails 82 further positively positions the lower tubular section 48 relative to the upper tubular section 44 as the two sections are moved between their extended and retracted relative positions. In addition, the additional rollers 98 are positioned relative to the column stop surfaces 88 to engage against these surfaces 88 as shown in FIG. 2 when the lower tubular section 44 is moved to the extended position relative to the upper tubular section 42. The additional rollers 98 engage against the stop surfaces 88 to prevent further movement of the lower tubular section toward the extended position.

In operation, the retractable and extendable material loader apparatus 10 is assembled to a transfer 22' positioned along a conveyor 12 in a downstream direction from at least one other material transfer 22 positioned upstream along the conveyor. When the other upstream material transfer 22 is not loading material on the conveyor 12 and the retractable and extendable material loader apparatus 10 is loading material on the conveyor, the actuators 46 are operated to extend the lower tubular section 44 from the upper tubular section 42. This positions the bottom opening of the lower tubular section 44 in close proximity to the conveying surface 14 of the conveyor 12. Bulk material is then loaded onto the conveying surface 14 of the conveyor 12 through the upper tubular section 42 and the extended lower tubular section 44. The positioning of the lower tubular section 44 in close proximity to the conveying surface 14 reduces the potential for spillage of the material as it exits the extended lower tubular section and contacts the moving conveying surface 14.

When it is desirable to load material onto the conveying surface 14 from the other upstream material transfer 22, the actuators 46 of the retractable and extendable material loader apparatus 10 are then operated to move the lower tubular section 44 upwardly to the retracted position relative to the upper tubular section 42. This raises the lower tubular section 44 above the conveying surface 14 and provides adequate clearance for the material loaded onto the conveying surface 14 from the other upstream material transfer 22 to pass beneath the retractable and extendable material loader apparatus 10.

Thus, the apparatus of the invention overcomes the problem of spillage of material from a moving conveying surface by a second material loader positioned along the conveying surface.

Although the apparatus of the invention has been described above by referring to a single embodiment of the invention, it should be understood that modifications and variations could be made to the apparatus without departing from the intended scope of the following claims.

What is claimed is:

1. A retractable and extendable material loader apparatus for directing material onto a conveyor, the apparatus comprising:

a first tubular section having a first interior bore;

a second tubular section having a second interior bore, the second interior bore communicating with the first interior bore, and the first and second tubular sections being operatively connected together for relative telescoping movement between retracted relative positions of the first and second tubular sections where the first and second interior bores have a first combined length, and extended relative positions of the first and second tubular sections where the first and second interior bores have a second combined length that is larger than the first combined length;

an actuator that is operatively connected between the first and second tubular sections and is selectively operable to move the first and second tubular sections to the retracted relative positions and the extended relative positions of the first and second tubular sections;

a guide surface that is fixed stationary relative to the first tubular section, the guide surface having a length that extends alongside the first tubular section and alongside the second tubular section; and, a guide surface follower that is fixed stationary relative to the second tubular section for movement of the guide surface follower along the length of the guide surface in response to the actuator moving the first and second tubular sections to the retracted relative positions and the extended relative positions.

2. The apparatus of the claim 1, further comprising:
the first tubular section having a center axis;
the second tubular section having a center axis that is coaxial with the first tubular section center axis; and,
the guide surface being a straight surface with the guide surface length being parallel to the center axes of the first and second tubular members.

3. The apparatus of claim 1, further comprising:
the guide surface is one of a plurality of guide surfaces that are each fixed stationary relative to the first tubular section and are each straight surfaces having lengths that are parallel to the center axes of the first and second tubular sections; and,
the guide surface follower is one of a plurality of guide surface followers that are each fixed stationary relative to the second tubular section and are each positioned for movement along the length of one of the plurality of guide surfaces in response to the actuator moving the first and second tubular sections to the retracted relative positions and the extended relative positions.

4. The apparatus of claim 1, further comprising:
the guide surface follower extending from the second tubular section and being positioned on an opposite side of the guide surface from the second tubular section.

5. The apparatus of claim 1, further comprising:
the guide surface follower having an opening through the guide surface follower; and,
the guide surface extending through the opening in the guide surface follower.

6. The apparatus of claim 1, further comprising:
a stop surface fixed stationary relative to the guide surface at a position where the stop surface is contacted by a portion of the guide surface follower when the actuator moves the first and second tubular sections to the extended relative positions.

7. The apparatus of claim 1, further comprising:
the guide surface follower having a roller that engages in rolling contact with the guide surface.

8. The apparatus of claim 1, further comprising:
a conveyor positioned adjacent the second tubular section where the second tubular section is moved toward the conveyor when the actuator moves the first and second tubular sections to the extended relative positions and the second tubular section is moved away from the conveyor when the actuator moves the first and second tubular sections to the retracted relative positions.

9. The apparatus of claim 8, further comprising:
the conveyor having a conveying surface that moves in a downstream direction from an upstream end of the conveyor to a downstream end of the conveyor; and,
a material discharge chute positioned adjacent the conveyor for discharging material onto the conveying surface, the first and second tubular sections being positioned in the downstream direction of the conveying surface from the discharge chute.

10. A retractable and extendable material loader apparatus for directing material onto a conveyor, the apparatus comprising:
a first tubular section having a first interior bore;
a second tubular section having a second interior bore, the second interior bore communicating with the first interior bore, and the first and second tubular sections being operatively connected together for relative telescoping movement between retracted relative positions of the first and second tubular sections where the first and second interior bores have a first combined length, and extended relative positions of the first and second tubular sections where the first and second interior bores have a second combined length that is larger than the first combined length;
an actuator that is operatively connected between the first and second tubular sections and is selectively operable to move the first and second tubular sections between the retracted relative positions and the extended relative positions of the first and second tubular sections;
a plurality of columns that are fixed stationary relative to the first tubular section at positions that are spatially arranged around the first tubular section, each of the columns having a length that extends alongside the first tubular section and the second tubular section; and,
a plurality of rollers mounted on the second tubular section at positions that are spatially arranged around the second tubular section, each of the rollers engaging in rolling contact with a column of the plurality of columns in response to the actuator moving the first and second tubular sections between the retracted relative positions and the extended relative positions.

11. The apparatus of claim 10, further comprising:
the first tubular section having a center axis;
the second tubular section having a center axis that is coaxial with the first tubular section center axis; and,
the plurality of columns each having straight guide surfaces that are engaged by the plurality of rollers and are parallel with the center axes of the first and second tubular sections.

12. The apparatus of claim 10, further comprising:
the plurality of rollers includes pairs of rollers that engage in rolling contact with opposite sides of each column of the plurality of columns.

13. The apparatus of claim 10, further comprising:
the plurality of rollers being mounted on a plurality of followers that each extend from the second tubular section around a column of the plurality of columns.

14. The apparatus of claim 10, further comprising:
each column of the plurality of columns having a stop surface on the column that is positioned to be engaged by a roller of the plurality of rollers when the actuator moves the first and second tubular sections to the extended relative positions.

15. The apparatus of claim 10, further comprising:
a conveyor positioned adjacent the second tubular section where the second tubular section is moved toward the conveyor when the actuator moves the first and second tubular sections to the extended relative positions and the second tubular section is moved away from the conveyor when the actuator moves the first and second tubular sections to the retracted relative positions.

16. The apparatus of claim 15, further comprising:
the conveyor having a conveying surface that moves in a downstream direction from an upstream end of the conveyor to a downstream end of the conveyor; and,
a material discharge chute positioned adjacent the conveyor for discharging material onto the conveying surface, the first and second tubular sections being positioned in the downstream direction of the conveying surface from the discharge chute.

17. A retractable and extendable material loader apparatus for directing material onto a conveyor, the apparatus comprising:
an upper tubular section having a cylindrical upper sidewall, the upper sidewall having a length with opposite top and bottom openings for receiving material through the top opening, directing the material through the upper sidewall, and with the material exiting the upper sidewall through the bottom opening;

a lower tubular section having a cylindrical lower sidewall, the lower sidewall having a length with opposite top and bottom openings for receiving material exiting the upper sidewall through the lower sidewall top opening, directing the material through the lower sidewall, and with the material exiting the lower sidewall through the lower sidewall bottom opening, the lower sidewall extending around the upper sidewall adjacent the upper sidewall bottom opening for relative telescoping movement of the lower sidewall over the upper sidewall between retracted relative positions of the upper and lower sidewalls where the upper and lower sidewalls have a first combined length, and extended relative positions of the upper and lower sidewalls where the upper and lower sidewalls have a second combined length that is larger than the first combined length;

an actuator that is operatively connected between the upper and lower sidewalls and is selectively operable to move the lower sidewall over the upper sidewall between the retracted relative positions and the extended relative positions of the upper and lower sidewalls;

a plurality of columns that are fixed stationary relative to the upper tubular section at positions that are spatially arranged around the upper tubular section, each of the columns having a length that extends vertically downwardly alongside the upper sidewall length, across the top opening of the lower sidewall and across the bottom opening of the upper sidewall, and alongside the lower sidewall length; and, a plurality of rollers mounted on the lower tubular section at positions that are spatially arranged around the lower tubular section, the plurality of rollers engaging in rolling contact with the plurality of columns in response to the actuator moving the upper and lower sidewalls between the retracted relative positions and the extended relative positions.

18. The apparatus of claim 17, further comprising:

the upper and lower sidewalls being coaxial and having a center axis; and, the plurality of columns extending parallel to the center axis.

19. The apparatus of claim 17, further comprising:

each column of the plurality of columns having a stop surface on the column that is positioned to be engaged by a roller of the plurality of rollers when the actuator moves the first and second sidewalls to the extended relative positions.

20. The apparatus of claim 17, further comprising:

the plurality of rollers includes pairs of rollers that engage in rolling contact with opposite sides of each column of the plurality of columns.

21. The apparatus of claim 20, further comprising:

the plurality of rollers being mounted on a plurality of followers that each extend from the second tubular section around a column of the plurality of columns.

22. The apparatus of claim 17, further comprising:

a conveyor positioned adjacent the second tubular section where the second tubular section is moved toward the conveyor when the actuator moves the first and second sidewalls to the extended relative positions and the second tubular section is moved away from the conveyor when the actuator moves the first and second sidewalls to the retracted relative positions.

23. The apparatus of claim 22, further comprising:

the conveyor having a conveying surface that moves in a downstream direction from an upstream end of the conveyor to a downstream end of the conveyor; and, a material discharge chute positioned adjacent the conveyor for discharging material onto the conveying surface, the first and second tubular sections being positioned in the downstream direction of the conveying surface from the discharge chute.

* * * * *